(12) United States Patent
Kim

(10) Patent No.: US 12,151,653 B2
(45) Date of Patent: Nov. 26, 2024

(54) WIPER DEVICE

(71) Applicant: CAP CORPORATION, Sangju-si (KR)

(72) Inventor: Hyung Tae Kim, Sangju-si (KR)

(73) Assignee: CAP CORPORATION, Sangju-si (KR)

( * ) Notice: Subject to any disclaimer, the term of this patent is extended or adjusted under 35 U.S.C. 154(b) by 0 days.

(21) Appl. No.: 18/185,592

(22) Filed: Mar. 17, 2023

(65) Prior Publication Data

US 2023/0294640 A1 Sep. 21, 2023

(30) Foreign Application Priority Data

Mar. 18, 2022 (KR) .................. 10-2022-0033896

(51) Int. Cl.
*B60S 1/40* (2006.01)
*B60S 1/34* (2006.01)

(52) U.S. Cl.
CPC ............ *B60S 1/4087* (2013.01); *B60S 1/4083* (2013.01); *B60S 1/3475* (2013.01)

(58) Field of Classification Search
CPC ........ B60S 1/40; B60S 1/4083; B60S 1/4087; B60S 2001/4022; B60S 2001/4035; B60S 2001/4058; B60S 2001/4061
USPC .......................................... 15/250.32, 250.43
See application file for complete search history.

(56) References Cited

U.S. PATENT DOCUMENTS

| | | | | |
|---|---|---|---|---|
| 2,977,141 | A * | 3/1961 | Ryck | B60S 1/40 403/189 |
| 6,158,078 | A * | 12/2000 | Kotlarski | B60S 1/3868 15/250.43 |
| 2004/0244137 | A1* | 12/2004 | Poton | B60S 1/4006 15/250.43 |
| 2012/0110773 | A1* | 5/2012 | Thielen | B60S 1/3849 15/250.32 |
| 2013/0167317 | A1* | 7/2013 | Oslizlo | B60S 1/4019 15/250.32 |
| 2021/0009084 | A1* | 1/2021 | Pina-Cabello | B60S 1/4077 |

FOREIGN PATENT DOCUMENTS

| | | | |
|---|---|---|---|
| DE | 3416505 | * | 11/1985 |
| FR | 2600292 | * | 12/1987 |
| GB | 2081075 | * | 2/1982 |
| GB | 2348118 | * | 9/2000 |
| KR | 10-2009-0085357 | * | 8/2009 |

* cited by examiner

*Primary Examiner* — Gary K. Graham
(74) *Attorney, Agent, or Firm* — Maier & Maier, PLLC

(57) ABSTRACT

A wiper device configured for removing foreign substances that are stuck on a windshield and connected to a wiper arm includes: a contact member configured for wiping out the foreign substances, a support member made of an elastic material and configured for elastically supporting the contact member in such a way that the contact member is in close contact with the windshield, and an adaptor configured for connecting the support member and the wiper arm. The adaptor includes a first member connected to the support member and formed with an insertion hole configured for insertion by the wiper arm, and a second member vertically fitted into the first member and laterally rotated to be engaged with the first member to fix the wiper arm.

8 Claims, 8 Drawing Sheets

WIPER DEVICE

FIELD

The present disclosure relates to a wiper device.

BACKGROUND

Generally, visibility is interfered and safety is compromised if the windshield of a motor vehicle that is in motion is contaminated by the dust or various foreign substances in the air or the rain or snow due to weather conditions. Accordingly, motor vehicles are equipped with a wiper device for wiping out the rain, snow or other foreign substances from the windshield in order to secure the visibility for safe driving of the driver.

A wiper device is coupled to a wiper arm equipped in a vehicle through an adaptor and is operated via the wiper arm.

SUMMARY

The present disclosure provides a wiper device that is configured to securely connect a wiper arm with the wiper device and facilitate attachment and detachment of the wiper arm.

According to an aspect of the present disclosure, a wiper device configured for removing foreign substances attached to a window and connected to a wiper arm includes: an adhering member configured to wipe off the foreign substances; a support member configured to elastically support the adhering member so that the adhering member adheres to the window; and an adaptor configured to couple the support member with the wiper arm, wherein the adaptor comprises: a first member connected to the support member and formed with an insertion hole configured for insertion by the wiper arm; and a second member configured to be vertically fitted into the first member and laterally rotated to be engaged with the first member so as to fix the wiper arm.

The wiper device of the present disclosure may be readily installed owing to the adaptor configured with two members, one member being engaged with the other member while the wiper arm is inserted in the one member for easier coupling of the wiper arm.

DETAILED DESCRIPTION

Hereinafter, an embodiment of the present disclosure will be described in detail with reference to the accompanying drawings.

Figure 1:
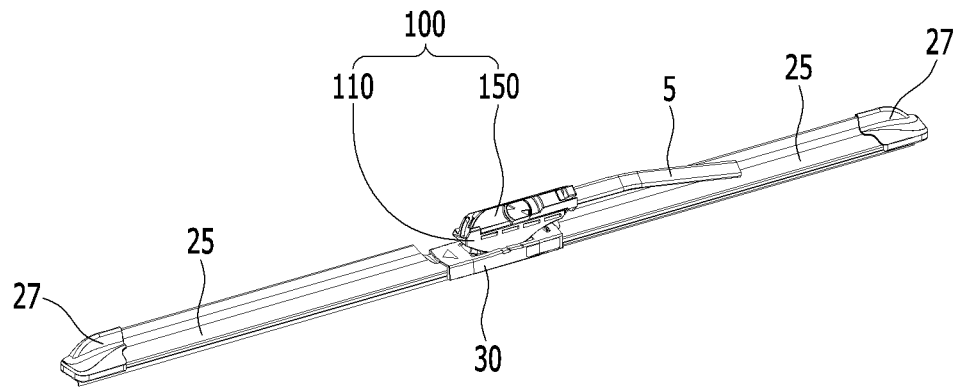
FIG. 1 is a perspective view showing a wiper device in accordance with an embodiment of the present disclosure.
Figure 2:
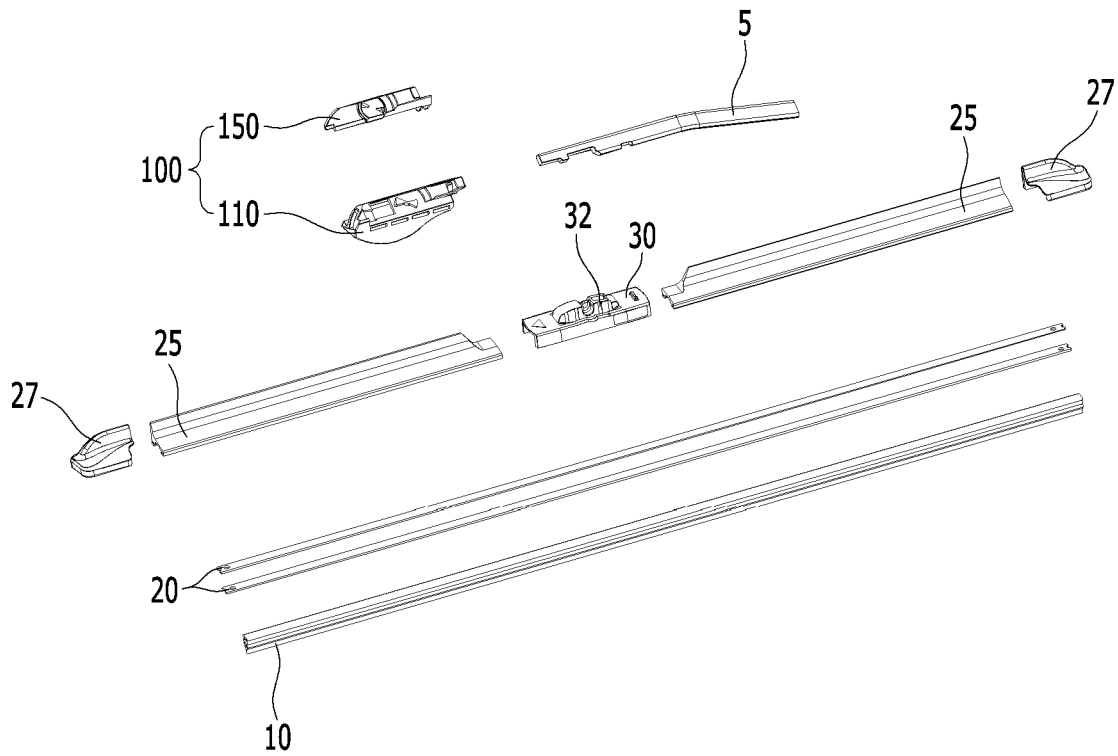
FIG. 2 is an exploded perspective view showing the wiper device in accordance with an embodiment of the present disclosure.

FIG. 1 is a perspective view showing a wiper device in accordance with an embodiment of the present disclosure, and FIG. 2 is an exploded perspective view showing the wiper device in accordance with an embodiment of the present disclosure.

The wiper device in accordance with an embodiment of the present disclosure is a device for removing foreign substances that are stuck on a windshield and includes a contact member 10, a support member 20 and an adaptor 100.

The contact member 10 is a part that is in close contact with the windshield and wipes out foreign substances. The contact member 10 of the present embodiment can be any kind of conventional contact member, for example, the rubber-made wiper.

The support member 20 is a part that elastically supports the contact member 10 so that the contact member 10 is in close contact with the windshield. The support member 20 may be a tournament structure in which a plurality of levers are connected by use of hinges. The support member 20 may be a flat structure made of a leaf spring. In addition, the support member 20 may be a hybrid structure with the tournament structure and flat structure combined.

As shown in FIG. 2, a pair of leaf springs having a predetermined curvature and elasticity conformed to the shape of the windshield may be used as the support member 20 to allow the contact member 10 to be in close contact with a curved surface of the windshield.

Coupled on the support member may be a cover member 25 and an end cap 27.

The adaptor 100 is a part that connects the support member 20 with the wiper arm 5. For instance, the adaptor 100 may be coupled to an adaptor coupling member 30 coupled to the support member 20, and the wiper arm 5 may be detachably connected to the adaptor 100.

Referring to FIG. 2, the adaptor coupling member 30 may include an adaptor connector unit 32, and the adaptor 100 may be pivotably coupled to the adapter connector unit 32.

According to the present embodiment, a pair of walls 118 (see FIG. 5) facing opposite to each other may be formed at a lower portion of the adaptor 100, and a rotation shaft 119 may be formed between the pair of walls 118. Here, the rotation shaft 119 of the adaptor 100 may be inserted into and pivotably coupled to the adaptor connector unit 32.

The adaptor 100 may be configured for engagement and release of the first member 110 and the second member 150.

Figure 3:
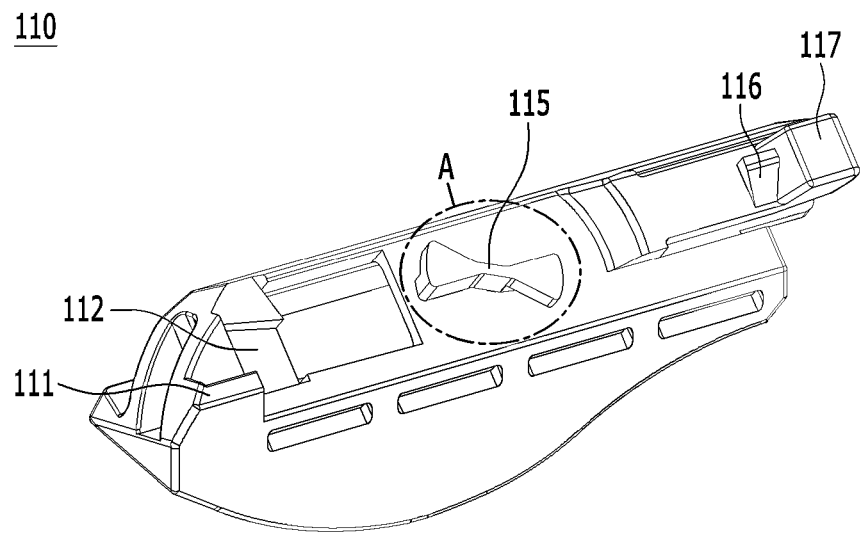
FIG. 3 shows the first member of the adapter of the wiper device in accordance with an embodiment of the present disclosure.
Figure 4:
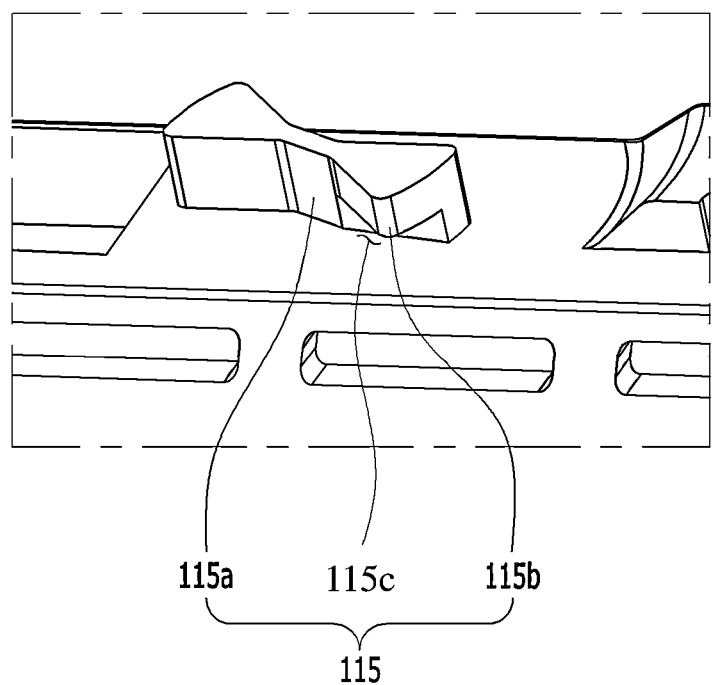
FIG. 4 shows the first member of the adapter of the wiper device in accordance with an embodiment of the present disclosure.
Figure 5:
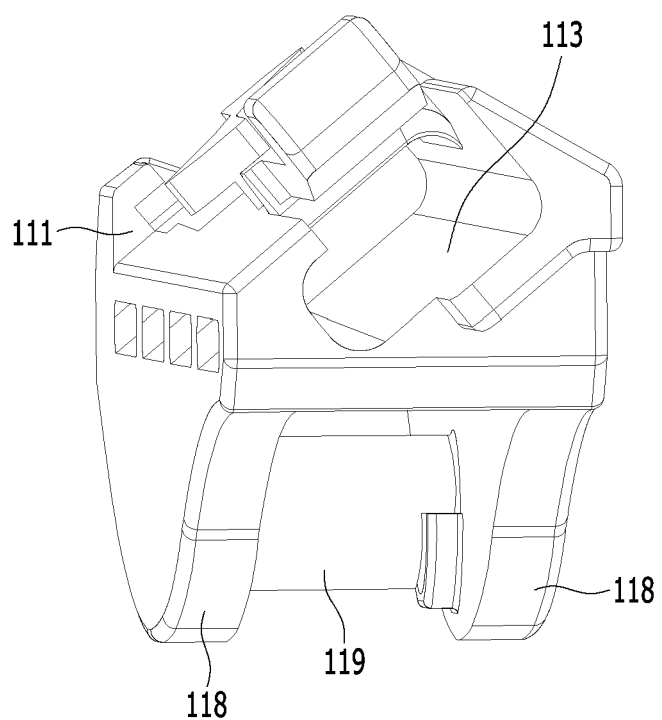
FIG. 5 shows the first member of the adapter of the wiper device in accordance with an embodiment of the present disclosure.
Figure 6:
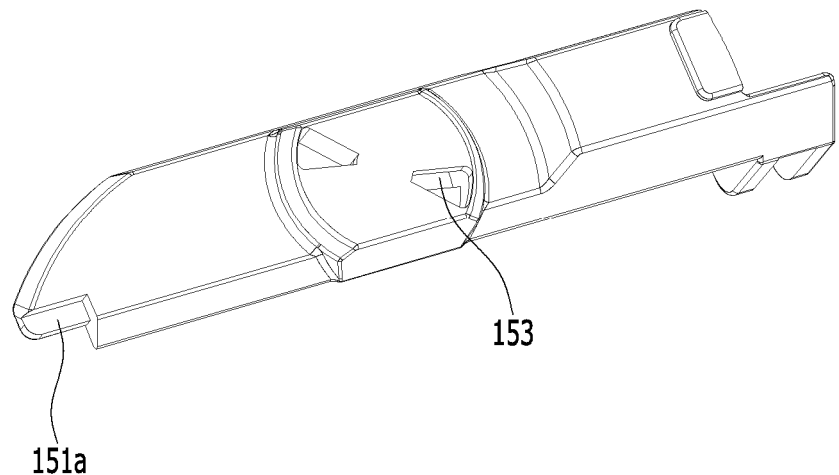
FIG. 6 shows the second member of the adapter of the wiper device in accordance with an embodiment of the present disclosure.
Figure 7:
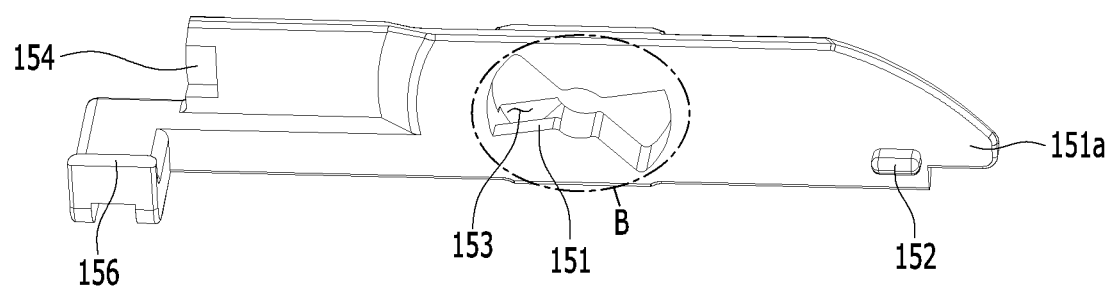
FIG. 7 shows the second member of the adapter of the wiper device in accordance with an embodiment of the present disclosure.
Figure 8:
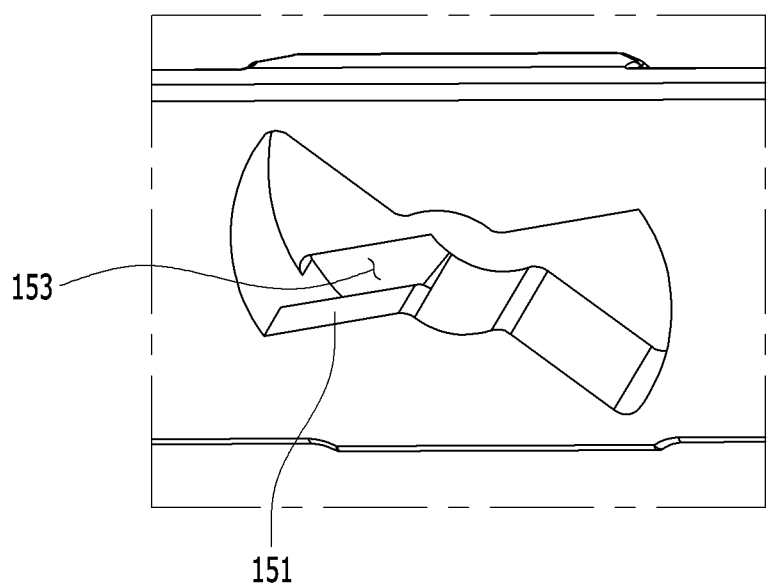
FIG. 8 shows the second member of the adapter of the wiper device in accordance with an embodiment of the present disclosure.

FIGS. 3 to 5 show the first member 110 of the adapter 100 of the wiper device in accordance with an embodiment of the present disclosure, FIGS. 6 to 8 show the second member 150 of the adapter 100 of the wiper device in accordance with an embodiment of the present disclosure. FIG. 4 shows part A of FIG. 3 in detail, and FIG. 8 shows part B of FIG. 7 in detail.

FIGS. 9 to 12 illustrate how the adapter 100 is engaged in the wiper device in accordance with an embodiment of the present disclosure.

According to the present embodiment, the first member 110 may be first connected to the support member 20 via the adaptor connector unit 32, and the second member 150 may be vertically fitted into the first member 110 and then laterally rotated to be engaged. In addition, the first member 110 is formed with an insertion hole 113 configured for insertion by the wiper arm 5, and the second member 150 may be engaged with the first member 110 to fix the wiper arm 5.

Referring to FIGS. 3 and 7, the second member 150 is formed with a coupling hole 153, and the first member 110 is formed with a coupling protrusion 115 configured for insertion into the coupling hole 153.

Referring to FIGS. 9 to 12, after the coupling protrusion 115 is inserted into the coupling hole 153, the second member 150 is rotated to engage the coupling protrusion 115 with the second member 150. Particularly, in the present embodiment, the coupling protrusion 115 may be engaged while aligning the second member 150 and the first member 110.

Referring to FIGS. 7 and 8, the second member 150 may include a lower wall 151, and the coupling hole 153 may penetrate the lower wall 151.

Referring to FIGS. 3 and 4, the first member 110 may include an upper surface facing opposite to the lower wall 151 of the second member 150. The upper surface may formed with the coupling protrusion 115, and an engaging groove 115c may be formed on a lateral surface of the coupling protrusion 115.

Specifically, the first member 110 may have a rod-shaped member 115a protruding from the upper surface thereof and a plate-shaped member 115b protruding from a lateral surface of the rod-shaped member 115a in the form of a wing. That is, the coupling protrusion 115 may comprise the rod-shaped member 115a and the plate-shaped member 115b protruding from the lateral surface of the rod-shaped member 115a. Here, a void may be formed between the upper surface of the first member 110 and the plate-shaped member 115b to become the engaging groove 115c. The width of the void between the upper surface of the first member 110 and the plate-shaped member 115b may be determined based on the thickness of the lower wall 151 of the second member 150 being inserted.

In addition, the overall outer shape of the coupling protrusion 115 may be formed to conform to the shape of the coupling hole 153 such that the coupling protrusion 115 may be inserted into the coupling hole 153. Similarly to a relationship between a key hole and a key, the coupling hole 153 and the coupling protrusion 115 may be formed with similar outer shapes to allow insertion at a consistent position.

Figure 9:
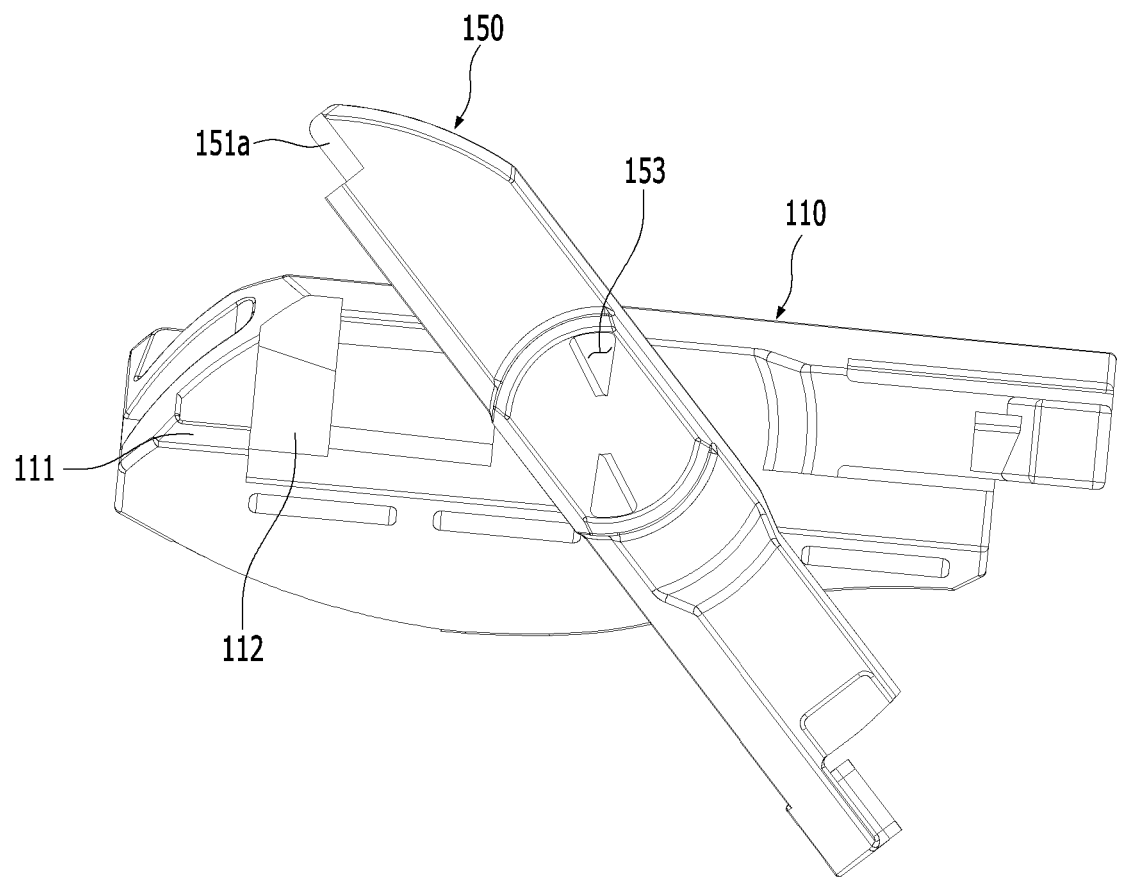
FIG. 9 illustrates how the adapter is engaged in the wiper device in accordance with an embodiment of the present disclosure.

Referring to FIG. 9, when the second member 150 is disposed on the first member 110 at a predetermined angle relative to the lengthwise direction of the wiper device, the coupling protrusion 115 may be fitted and inserted into the coupling hole 153, and the second member 150 may be downwardly fitted into the first member 110. According to the present embodiment, when the second member 150 is misaligned relative to the first member 110 in the clockwise direction, the coupling protrusion 115 may be fitted into the coupling hole 153.

Figure 10:
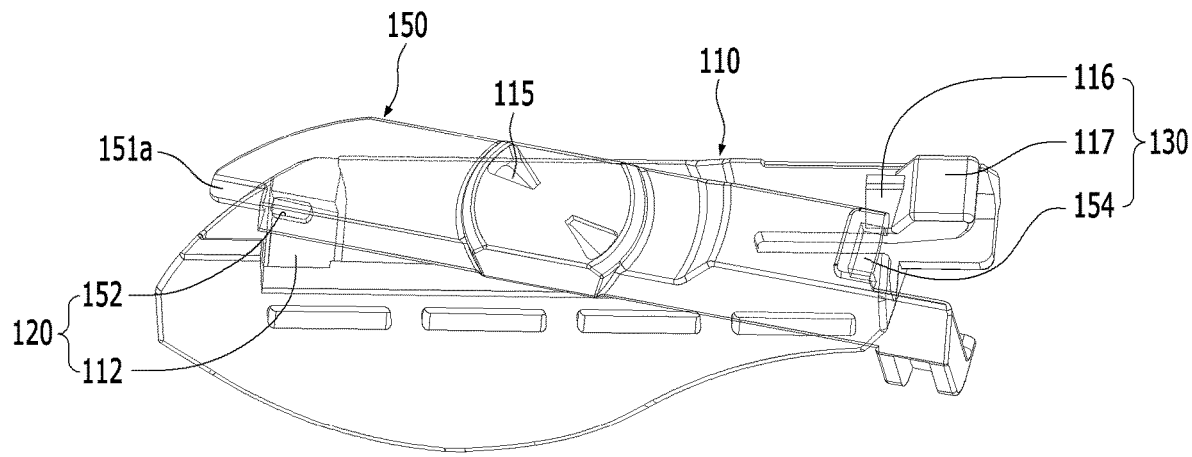
FIG. 10 illustrates how the adapter is engaged in the wiper device in accordance with an embodiment of the present disclosure.
Figure 11:
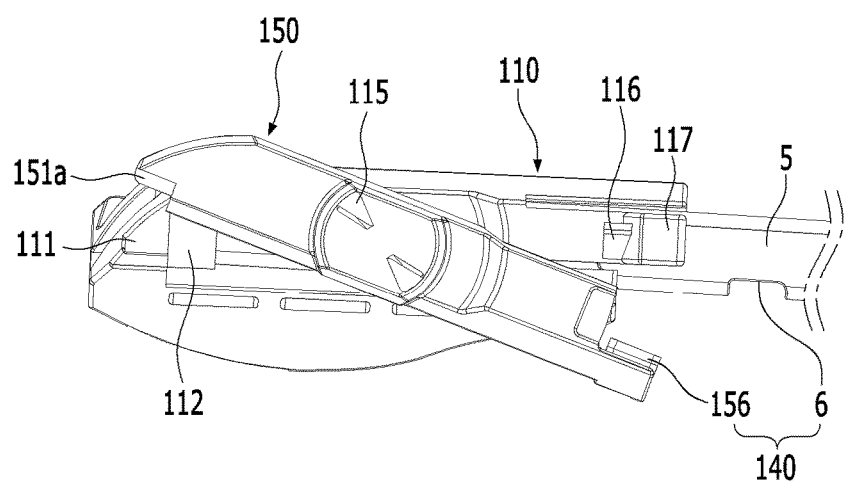
FIG. 11 illustrates how the adapter is engaged in the wiper device in accordance with an embodiment of the present disclosure.
Figure 12:
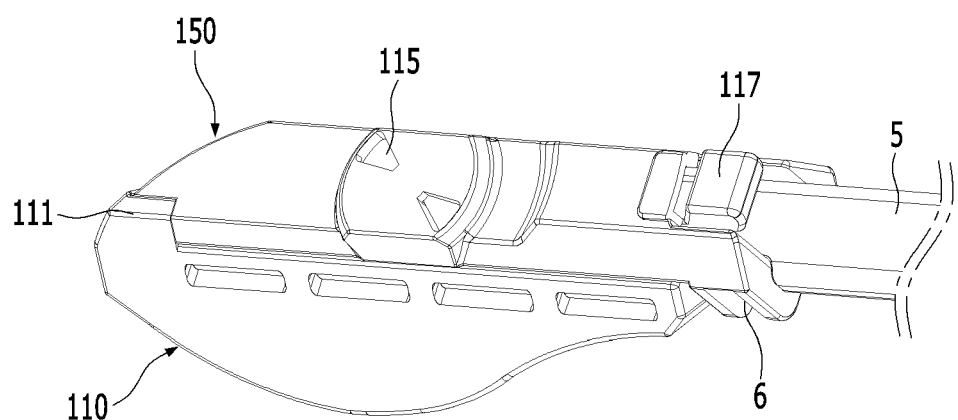
FIG. 12 illustrates how the adapter is engaged in the wiper device in accordance with an embodiment of the present disclosure.

Referring to FIGS. 10 to 12, after the insertion of the coupling protrusion 115 into the coupling hole 153, the second member 150 may be rotated relative to the first member 110 to engage the second member 150 to the first member 110. In this case, as the second member 150 is rotated, the lower wall 151 of the second member 150 may be fitted into the engaging groove 115c of the first member 110.

According to the present embodiment, the second member 150 disposed in the predetermined angle relative to the first member 110 may be rotated in the counterclockwise direction such that the first member 110 and the second member 150 may be aligned in the lengthwise direction of the wiper while the first member 110 and the second member 150 are engaged.

In this case, the adaptor 110 may limit the rotation angle of the second member 150 relative to the first member 110. Particularly, once the second member 150 is fitted into the first member 110 and rotated in one direction, the rotation angle of the second member 150 relative to the first member 110 in an opposite direction may be limited.

Referring to FIGS. 10 and 11, the adaptor 100 may comprise a reverse rotation limiting unit 120 configured to limit the rotation angle of the second member 150 relative to the first member 110 in the release direction.

The reverse rotation limiting unit 120 of the present embodiment may comprise a locking groove 112, which is concavely formed on the upper surface of the first member 110, and a locking protrusion 152 protruding from a lower surface of the second member 150. Accordingly, as the second member 150 is fitted into the first member 110 and rotated in one direction (counterclockwise), the locking protrusion 152 may be inserted into the locking groove 112. After the locking protrusion 152 is inserted into the locking groove 112, the locking protrusion 152 stays fitted in the locking groove 112, and thus the rotation angle of the second member 150 relative to the first member 110 is limited. Particularly, since the second member 150 is limited from rotating in a reverse direction, the second member 150 may be prevented from being released from the first member 110.

In addition, while the second member 150 stays fitted in the first member 110, the wiper arm 5 may be inserted into the first member 110, and the second member 150 may be easily engaged with the first member 110, thereby facilitating the installation of the adaptor 100.

Referring to FIGS. 10 and 11, in the present embodiment, after the coupling protrusion 115 is inserted into the coupling hole 153, the second member 150 is slightly rotated in the first member 110 to create a temporary coupling state. In the temporary coupling state, the locking protrusion 152 is inserted into the locking groove 112 such that the rotation of the second member 150 relative to the first member 110 is limited to a predetermined range. Here, the wiper arm 5 may be inserted into the insertion hole 113 of the first member 110.

Referring to FIG. 12, after the wiper arm 5 is inserted into the first member 110, the second member 150 may be completely rotated to completely engage the second member 150 with the first member 110. Here, the wiper arm 5 inserted in the insertion hole 113 may be fixed by the engagement of the second member 150 with the first member 110.

The adaptor 100 may further comprise a fixing unit 140 configured for fixing the wiper arm 5 inserted in the first member 110 at a position where the second member 150 is aligned with the first member 110.

Figure 13:
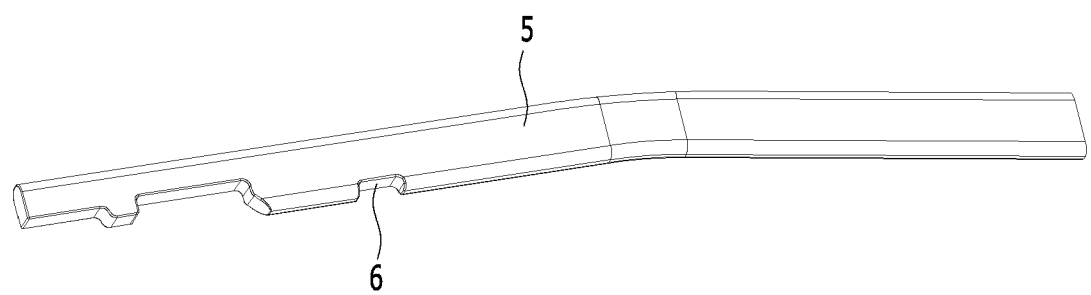
FIG. 13 shows the wiper arm configured to be coupled with the wiper device in accordance with an embodiment of the present disclosure.

FIG. 13 shows the wiper arm being coupled with the wiper device in accordance with an embodiment of the present disclosure.

Referring to FIGS. 11 and 13, the wiper arm may be formed with a fixing groove 6. Here, the fixing unit 140 of the present embodiment may comprise a fixing protrusion 156 formed on the second member 150. The fixing protrusion 156 may be inserted into the fixing groove 6 at a position where the second member 150 is aligned with the first member 110 to fix the wiper arm 5 to the first member 110.

In addition, an alignment unit 130 configured for fixing the position of the second member 150 relative to the first member 110 may be further provided at the position where the second member 150 is aligned with the first member 110.

Referring to FIG. 10, the alignment unit 130 of the present embodiment may comprise an alignment protrusion 116, which is protruded and elastically supported on the upper surface of the first member 110, and an alignment groove 154, which is formed on the second member 150 and configured for insertion by the alignment protrusion 116.

Referring to FIGS. 11 and 12, when the first member 110 and the second member 150 are aligned along the length of the wiper, the alignment protrusion 116 may be inserted into the alignment groove 154 to fix the second member 150 in an aligned position.

Here, the alignment protrusion 116 may be formed on a cantilever made of elastic materials and elastically supported. In addition, the cantilever may have a protruding structure of button 117 formed at an end thereof, and the alignment protrusion 116 may be released from the alignment groove 154 when the button 117 is pressed. Accordingly, to release the second member 150 from the first member 110, the button 117 may be pressed to release the alignment unit 130, and then the second member 150 may be rotated to be released.

Meanwhile, when the first member 110 and the second member 150 are aligned along the length of the wiper, the end of the second member 150 may be partially inserted into and fixed to the first member 110.

Referring to FIGS. 11 and 12, the second member 150 may be formed with an insertion unit 151a at a longitudinal end of the lower wall 151, and the first member 110 may be formed with an receiving unit 111, configured for insertion by the insertion unit 151a, at a longitudinal end thereof. The receiving unit 111 may be formed with an open lateral surface such that the insertion unit 151a may be fitted into the lateral surface of the receiving unit 111 when the second member 150 is rotated for alignment. Accordingly, the end of the second member 150 may be prevented from being lifted from the first member 110.

Although an embodiment of the present disclosure has been described, it shall be appreciated that various permutations and modifications are possible by those of ordinary skill in the art to which the present disclosure pertains without departing from the technical ideas and scopes of the present disclosure that are defined by the claims appended below.

It shall be also appreciated that there can be many other embodiments in the claims of the present disclosure than the embodiment described above.

DESCRIPTION OF KEY ELEMENTS

5: Wiper arm
6: Fixing groove
10: Contact member
20: Support member
25: Cover member
100: Adaptor
110: First member
112: Locking groove
113: Insertion hole
115: Coupling protrusion
116: Alignment protrusion
120: Reverse rotation limiting unit
130: Alignment unit
140: Fixing unit
150: Second member
151: Lower wall
152: Locking protrusion
153: Coupling hole
154: Alignment groove
156: Fixing protrusion

What is claimed is:

1. A wiper device configured for removing foreign substances that are stuck on a windshield and connected to a wiper arm, comprising:
a contact member configured for wiping out the foreign substances;
a support member made of an elastic material and configured for elastically supporting the contact member in such a way that the contact member is in close contact with the windshield; and
an adaptor configured for connecting the support member and the wiper arm,
wherein the adaptor comprises:
a first member connected to the support member and formed with an insertion hole configured for insertion by the wiper arm; and
a second member vertically fitted into the first member and laterally rotated to be coupled with the first member to fix the wiper arm,
wherein the second member is formed with a coupling hole,
wherein the first member is formed with a coupling protrusion configured for insertion into the coupling hole, and
wherein, after the coupling protrusion is inserted into the coupling hole, the second member is rotated to engage the coupling protrusion to the coupling hole.

2. The wiper device of claim 1, wherein the adaptor further comprises a reverse rotation limiting unit configured, after the second member fitted into the first member and rotated in one direction, to limit a rotation angle of the second member relative to the first member in an opposite direction.

3. The wiper device of claim 2, wherein the reverse rotation limiting unit comprises:
a locking groove concavely formed on an upper surface of the first member; and
a locking protrusion protruding from a lower surface of the second member,
wherein, when the second member is fitted into the first member and rotated in the one direction, the locking protrusion is inserted into the locking groove to limit the rotation angle of the second member relative to the first member.

4. The wiper device of claim 1, wherein the second member comprises a lower wall in contact with the first member, and the coupling hole penetrates the lower wall, wherein the first member comprises an upper surface facing opposite to the lower wall, and the coupling protrusion is protruded on the upper surface, and an engaging groove is formed on a lateral surface of the coupling protrusion, and wherein, when the second member is rotated relative to the first member after the coupling protrusion is inserted into the coupling hole, the lower wall of the second member is fitted into the engaging groove.

5. The wiper device of claim 1, wherein the adaptor further comprises an alignment unit configured, at a position where the second member is aligned with the first member, for fixing the position of the second member relative to the first member.

6. The wiper device of claim 5, wherein the alignment unit comprises:

an alignment protrusion protruded and elastically supported on an upper surface of the first member, and an alignment groove formed on the second member and configured for insertion by the alignment protrusion.

7. The wiper device of claim 5, wherein the adaptor further comprises a fixing unit configured for fixing the wiper arm inserted in the first member at the position where the second member is aligned with the first member.

8. The wiper device of claim 7, wherein the wiper arm is formed with a fixing groove, and wherein the fixing unit comprises a fixing protrusion formed on the second member and inserted into the fixing groove at the position where the second member is aligned with the first member.

* * * * *